US009197544B2

(12) United States Patent
Smith

(10) Patent No.: US 9,197,544 B2
(45) Date of Patent: Nov. 24, 2015

(54) COMPREHENSIVE MULTIPATH ROUTING FOR CONGESTION AND QUALITY-OF-SERVICE IN COMMUNICATION NETWORKS

(71) Applicant: The Regents of the University of California, Oakland, CA (US)

(72) Inventor: Bradley R Smith, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 72 days.

(21) Appl. No.: 14/348,664

(22) PCT Filed: Oct. 19, 2012

(86) PCT No.: PCT/US2012/061147
§ 371 (c)(1),
(2) Date: Mar. 31, 2014

(87) PCT Pub. No.: WO2013/059683
PCT Pub. Date: Apr. 25, 2013

(65) Prior Publication Data
US 2014/0241366 A1 Aug. 28, 2014

Related U.S. Application Data

(60) Provisional application No. 61/627,866, filed on Oct. 19, 2011.

(51) Int. Cl.
*H04L 12/707* (2013.01)
*H04L 12/741* (2013.01)
*H04L 12/703* (2013.01)
*H04L 12/723* (2013.01)

(52) U.S. Cl.
CPC .............. *H04L 45/24* (2013.01); *H04L 45/74* (2013.01); *H04L 45/28* (2013.01); *H04L 45/50* (2013.01)

(58) Field of Classification Search
None
See application file for complete search history.

(56) References Cited

U.S. PATENT DOCUMENTS

| 4,905,233 A | 2/1990 | Cain et al. |
| 6,104,700 A | 8/2000 | Haddock et al. |
| 6,526,056 B1 | 2/2003 | Rekhter et al. |
| 2002/0159463 A1 | 10/2002 | Wang |
| 2003/0123457 A1 | 7/2003 | Koppol |
| 2005/0195815 A1* | 9/2005 | Chaudhuri ............ H04L 45/60 370/389 |

(Continued)

OTHER PUBLICATIONS

Gallager R.G. A minimum delay routing algorithm using distributed computation. IEEE Transactions on Communications, 25(1):73-85, Jan. 1977.
Nelakuditi et al. On Selection of Paths for Multipath Routing. In Proceedings 9th International Workshop on Quality of Service (IWQoS) '01, 2001, pp. 170-184.
Paganini et al. A unified approach to congestion control and node-based multipath routing. IEEE/ACM Transactions on Networking, 17(5):1413-1426, Oct. 10, 2009.

(Continued)

*Primary Examiner* — Min Jung
(74) *Attorney, Agent, or Firm* — Lumen Patent Firm

(57) ABSTRACT

A packet routing method includes computing, for each source node in the data network and each destination node in the data network, a set of multiple routes providing a full range of performance from the source node to the destination node. The multiple routes are preferably precomputed and stored. The full range of performance is defined by a set of dominant routes, defined in terms of a partial order on a multi-dimensional space whose dimensions correspond to performance metrics such as bandwidth, latency metric, and jitter. The method selects, for a packet originating from a source node and addressed to a destination node, a route from the computed set of multiple routes and forwards the packet in accordance with the selected route.

12 Claims, 6 Drawing Sheets

(56) References Cited

U.S. PATENT DOCUMENTS

| | | | |
|---|---|---|---|
| 2007/0124496 A1* | 5/2007 | Laamanen | H04L 45/00 709/238 |
| 2009/0016370 A1* | 1/2009 | Karol | H04L 5/0037 370/412 |
| 2011/0116377 A1 | 5/2011 | Batz et al. | |
| 2011/0116499 A1* | 5/2011 | Lim | H04L 45/22 370/355 |
| 2011/0125921 A1* | 5/2011 | Karenos | H04L 45/00 709/240 |

OTHER PUBLICATIONS

Taft-Plotkin et al. Quality-of-service routing using maximally disjoint paths. In Proceedings 7th International Workshop on Quality of Service (IWQoS) '99, pp. 119-128, 1999.

Vutukury et al. A traffic-engineering approach based on minimum-delay routing. In Proceedings International Conference on Computer Communications and Networks 2000, pp. 42-47, 2000.

Vutukury et al. A simple approximation to minimum-delay routing. In Proceedings SIGCOMM 99, pp. 227-238, Aug. 1999.

* cited by examiner

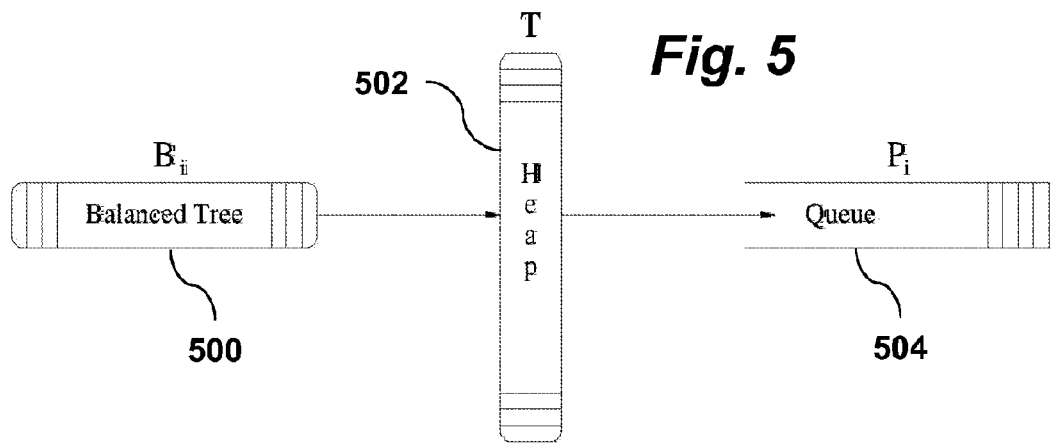

Fig. 5

600
computing, for each source node in the data network and each destination node in the data network, a set of multiple routes providing a full range of performance from the source node to the destination node

602
selecting, for a packet originating from a source node and addressed to a destination node, a route selected from the computed set of multiple routes

604
forwarding the packet in accordance with the selected route

Fig. 6

COMPREHENSIVE MULTIPATH ROUTING FOR CONGESTION AND QUALITY-OF-SERVICE IN COMMUNICATION NETWORKS

CROSS-REFERENCE TO RELATED APPLICATIONS

This application is a 371 of PCT/US2012/061147 filed on Oct. 19, 2012. PCT/US2012/061147 filed on Oct. 19, 2012 claims the benefit of U.S. Provisional Application 61/627,866 file on Oct. 19, 2011.

FIELD OF THE INVENTION

This invention relates to communication networks. In particular, the invention relates to routing solutions in data communications networks such as the Internet.

BACKGROUND OF THE INVENTION

The Internet is based on a single-path communications model. This model imposes significant constraints on the ability of the Internet to satisfy the quality-of-service requirements of network applications, and results in significant inefficiencies in the use of network resources that are manifested as congestion. The result has been the need to over-provision Internet-based systems to meet the basic needs of modern communications. With the adoption of the Internet as the converged communication infrastructure for the 21st century, this is clearly not an acceptable long-term solution.

The two basic approaches to packet switching are virtual circuits and datagrams. Both schemes segment messages into limited-size packets, add control information to each packet to accomplish its switching, and rely on statistical multiplexing of the shared communication links. Virtual circuits emulate circuit-switching used in the early telephone network. The virtual-circuit model is connection-oriented in that communication occurs in three phases (path setup, data transfer, and path teardown), routing is done once per flow by the ingress node during path setup, and paths are implemented using label-swap forwarding such that all traffic for a given flow follows the same path through the network.

In contrast, packet switching based on datagrams is a more drastic departure from the circuit-switching model. Datagram switching is connectionless in that there are no phases in the communication process, packets are transmitted when the source host is ready to transmit, routing is computed at every router in the network on an event-driven basis, and the forwarding decision is made on a hop-by-hop basis as packets flow through the network with the result that different packets in a given flow may follow different paths through the network.

The datagram approach to packet switching has a number of strengths. It is robust in the sense that it co-locates the routing process with the state it computes, manifesting a design principle called fate-sharing. This ensures that the failure of any single component of an internet does not invalidate state located elsewhere in the internet, effectively localizing the affects of any failures. The datagram model is efficient and responsive for a couple of reasons. First, by implementing distributed control of forwarding state it requires only simplex communication of topology change events. Second, by assuming a distributed, hop-by-hop routing model, the datagram model enables the use of more efficient and responsive routing algorithms that can operate with partial information regarding the topology of the network.

Virtual-circuit switching is based on a centralized routing model in that routes are computed on-demand, and forwarding is source-specified through the use of path setup techniques. Hence, virtual circuits are less robust than datagrams due to the requirement that the ingress router control remote forwarding state in routers along the paths it has set up. The virtual-circuit model is less efficient and responsive for a couple of reasons. First, by implementing centralized control of forwarding state it requires duplex communication of topology change events: outbound notification of a topology event, and inbound notification of forwarding state changes. Second, by assuming a centralized routing computation the virtual-circuit model requires the use of full-topology routing algorithms to ensure every router can compute optimal paths to any destination in an internet.

The architecture of today's Internet is based on the catenet model of internetworking. In the catenet model, networks are built by the concatenation of disparate networks through the use of routers. The primary goals of the catenet model, and therefore the Internet architecture, were to support packet-switched communication between computers over internets composed of networks based on diverse network technologies, and to encourage the development and integration of new networking technologies into these internets.

To achieve these goals, a simple but powerful variant of the datagram communication model was adopted. Specifically, the Internet routing architecture is based on a best effort communication model in which the "best" path is pre-computed by each router to all destinations (triggered by topology changes), and packets are forwarded on a best effort basis (and may be dropped or delivered out of order in the event of congestion or routing changes). Packet forwarding is implemented on a hop-by-hop basis using destination-address based packet forwarding state computed by the routing process.

This best-effort, distributed, hop-by-hop, datagram routing model has proven surprisingly powerful. Indeed, much of the success of the Internet architecture can be attributed to its routing model. However, largely as a product of its own success, limitations of this model are being encountered as it is applied to more demanding applications.

A significant limitation is the model only supports a single path to each destination. Specifically, Internet forwarding state is composed of a single entry for each destination in an internet giving the next-hop router on the path to the destination. As a result, only one path is supported to any given destination, and that path is computed to optimize a single metric.

Unfortunately, the single-path limitation of the Internet translates to the inability to directly support applications with diverse QoS requirements. Clearly, such a model is not adequate for many of the demanding applications to which the Internet is currently being applied.

In addition, single-path routing results in significant inefficiencies in the use of network resources. With single-path routing, multiple flows can be routed over one or more congested links while other regions of the network are lightly loaded.

In view of the above, there have been attempts to improve support for QoS and the use of multiple paths for both QoS and congestion control. None of these approaches, however, adequately addresses both QoS and congestion control, while being compatible with the Internet architecture in terms of implementing a datagram communication model (pre-computation of routes and hop-by-hop forwarding).

Two enhancements to the Internet architecture to support QoS have been proposed representing fundamentally different approaches to solving the problem of resource management in the context of performance requirements, the Intserv and Diffserv architectures.

The goal of the integrated services (Intserv) architecture is to define an integrated Internet service model that supports best-effort, real-time, and controlled link sharing requirements. Intserv makes the assumption that network resources must be explicitly controlled, and defines an architecture where applications reserve the network resources required to implement their functionality, and an infrastructure of admission control, traffic classification, and traffic scheduling mechanisms which implement the reservations. In the Intserv architecture resource reservations are sent along paths computed by the existing routing infrastructure. As a result, requests may be denied when resources do not exist along the current route when in fact paths exist that could satisfy the request. Intserv is based on a virtual-circuit communications model and, as such, has all the limitations of that model relating to robustness, efficiency, and responsiveness discussed above.

In contrast, the differentiated services (Diffserv) architecture provides resource management without the use of explicit reservations. In Diffserv, a small set of per-hop forwarding behaviors (PHBs) is defined within a Diffserv domain which provide resource management services appropriate to a class of application resource requirements. Traffic classifiers are deployed at the edge of a Diffserv domain that classify traffic for one of these PHBs. Inside a Diffserv domain, routing is performed using traditional hop-by-hop, address-based forwarding mechanisms.

Diffserv retains the best-effort, distributed, hop-by-hop, datagram routing model of the Internet, and therefore retains the robustness, efficiency, and responsiveness of the Internet discussed in Section 1. However, similar to the Intserv model, communications resources to a given flow in a Diffserv environment are limited to those available along the paths computed by the existing routing infrastructure. As a result QoS requirements may not be satisfied when adequate resources are not available along the current route when in fact paths exist that could satisfy the requirements.

In addition, there has been extensive research into solutions for reducing congestion through the use of multiple paths to each destination. This approach enhances the Internet routing architecture to support multiple paths between a given source and destination. Significant research has been done into multi-path solutions for QoS and congestion, however a comprehensive solution for both QoS and congestion that is compatible with the Internet's datagram, hop-by-hop model of communication is still elusive.

Vutukury and Garcia-Luna ("A simple approximation to minimum-delay routing." In *Proceedings SIGCOMM 99*, pages 227-238, August 1999) present an approximation to Gallager's minimum-delay routing algorithm ("A minimum delay routing algorithm using distributed computation." *IEEE Transactions on Communications*, 25(1):73-85, January 1977). The solution pre-computes multiple paths of unequal length to each destination, along with an allocation of traffic to each path. The primary goal of the algorithm is to minimize the delay traffic experiences as it traverses the network. In this work traffic is forwarded along different paths without regard to the flow it is a part of. To address the problem this causes for TCP traffic their later paper ("A traffic-engineering approach based on minimum-delay routing." In *Proceedings International Conference on Computer Communications and Networks* 2000, pages 42-47, 2000) presents a solution that allocates TCP flows to a single path. This solution precomputes paths and uses hop-by-hop forwarding, however its focus is minimizing delay.

Taft-Plotkin et al ("Quality-of-service routing using maximally disjoint paths." In *Proceedings 7th International Workshop on Quality of Service (IWQoS)* '99, pages 119-128, 1999) present a solution for using multiple paths to meet the QoS requirements of flows. A fixed number of paths are precomputed that include maximally disjoint paths with minimum delay and maximum bandwidth. These paths are sorted by available bandwidth, and paths are selected by an ordered search of the list for the first path which satisfies the QoS requirements of the flow. The solution depends on per-flow path setup with admission control. The goal of the algorithm is to satisfy the QoS requirements of flows while minimizing congestion.

Nelakuditi and Zhang ("On selection of paths for multipath routing." In *Proceedings 9th International Workshop on Quality of Service (IWQoS)* '01, 2001) present a solution for minimizing congestion in a network by forwarding traffic over multiple paths. The solution computes a set of widest-shortest paths to each destination, where the size of the set is a parameter of the computation. Traffic is then allocated to these paths based on the offered load and blocking probability observed locally for each path. This solution pre-computes paths, but depends on path-setup for forwarding traffic, and does not attempt to satisfy QoS requirements of flows. One interesting result from the simulations presented in the paper is that only a small number of paths are needed for near optimal call blocking performance.

Paganini and Mallada ("A unified approach to congestion control and node-based multipath routing." *IEEE/ACM Transactions on Networking*, 17(5):1413-1426, October 2009) present a solution for implementing congestion control in the network layer. The solution computes multiple paths per destination in the routing computation and distributes traffic among these paths in response to a local measure of congestion based on queueing delay. Results are presented from simulations run with a RIP-based implementation of the algorithm. The solution pre-computes paths, and uses hop-by-hop forwarding. However it only addresses congestion control.

In summary, there has been extensive research into the use of multiple paths to minimize congestion, satisify QoS requirements of flows, and occasionally to do both. However, there appears to be no work that addresses the need for a comprehensive, multipath solution to congestion and QoS that is consistent with the Internet architecture's use of pre-computed routes and hop-by-hop forwarding. Accordingly, there remains a need for a general approach to such a solution.

SUMMARY OF THE INVENTION

In view of the foregoing, the present invention provides a new approach to routing packets over a network that satisfies all of these above requirements.

The present invention provides a new solution, called Dominant Set Multipath Routing (DSMR), that addresses these requirements. The DSMR algorithm computes the best set of routes between each source and destination that provides the full range of performance available from the network. This set is used to route flows over paths that both meet the QoS requirements of the flow and minimize congestion in the network. This technique is estimated to provide 3 to 11 times the capacity of single-path routing while meeting the QoS requirements of the flows and minimizing congestion in the network.

The metrics used in the routing computation have multiple components such as delay, available bandwidth, jitter, etc. The metrics for the set of routes between a given source and destination are treated as a partial ordered set in a multi-dimensional space whose dimensions correspond to these metrics. The DSMR algorithm computes the dominant set of metrics for this partial ordering, representing a best set of routes between the source and destination that provide the full range of performance in the network. A traffic classification function is then defined for assigning new flows to paths that meet the QoS requirements of the flow and have capacity for the new flow.

The methods of the invention provide a solution to the problems of congestion and providing quality-of-service (QoS) guarantees for network applications through the routing of traffic over multiple paths between a given source and destination. One aspect of the invention is the use of a set of paths that provides the full range of performance needed of a network for the applications to be deployed over the network. This set of paths may be used to load balance traffic (to avoid congestion) and to select paths for flow requests that meet the QoS needs of the specific flow. This performance range can run from the full range of performance available in a network (e.g., where the application requirements are not known ahead of time or are changing), to a set of specific targets selected to meet the needs of a set of applications (e.g., for a network to be used for Voice-over-IP and video streaming, use a set of paths that meet the performance needs of these applications).

According to one aspect of the invention, a packet routing method is implemented in a data network by network routing equipment. Preferably, the network is a wired data network and the packets are routed over wired connections between network routers. The method includes computing, for each source node in the data network and each destination node in the data network, a set of multiple routes providing a full range of performance from the source node to the destination node. The multiple routes are preferably precomputed and stored. The full range of performance is defined by a set of dominant routes, which are defined as follows. Each route from the source node to the destination node in the data network has multiple distinct performance metrics defining coordinates of a corresponding point in a multi-dimensional space. The multiple distinct performance metrics defining coordinates of the multi-dimensional space may include, for example, metrics such as a bandwidth metric, a latency metric, a jitter metric, and a reliability metric. Each of the dominant routes is defined as a route that has a corresponding point in the multi-dimensional space that is maximal with respect to a partial order defined on points in the multi-dimensional space corresponding to routes from the source node to the destination node.

The method also includes selecting, for a packet originating from a source node and addressed to a destination node, a route from the computed set of multiple routes, where the selecting comprises i) determining quality of service performance requirements for the packet based on traffic classification rules, and ii) selecting the route that minimizes network congestion and satisfies the quality of service performance requirements for the packet. The method also includes forwarding the packet in accordance with the selected route.

The selecting may include determining quality of service performance requirements for the packet based on traffic classification rules specified in terms of contents of the packet, in terms of a user associated with the packet, in terms of a port the packet arrives on, or in terms of one or more other environmental factors.

The method may be implemented in the data network by performing all steps of the method at a single network router device. The method may also be implemented in the data network by performing the computing and the selecting steps at a central network controller device, and performing the forwarding step at a network router device. This implementation corresponds to a "software-defined networking" approach, a popular example being "OpenFlow". The method may also be implemented in the data network by performing the computing at a central network controller device, and performing the selecting and forwarding steps at a network router device.

In some embodiments, selecting the route may include, if a label-swap tag is not present in the packet, computing the label-swap tag from traffic classification rules specificed in terms of contents of the packet. If a label-swap tag is already present in the packet, the forwarding may include forwarding the packet based on the label-swap tag in the packet.

In some embodiments, selecting the route may include performing network load balancing among the computed set of multiple routes.

In addition, in an other embodiments, instead of selecting a set of routes that provides the full range of performance in the network, the method may select a set of routes that meets specific performance needs of a predetermined set of applications that are to be deployed over the network. This targeted or customized routing model can be valuable in some circumstances (e.g., to reduce the overhead costs of this kind of routing). In general, the method may compute routes for the full range of performance requirements when the application mix is not known ahead of time or is continually changing, and the method may compute routes using targeted routing when the application mix is fixed or predetermined and efficiency is important.

In some embodiments of the invention, the computed routes may be organized into layers, e.g., where the first layer is the dominant set of all routes, the second layer is the dominant set of all routes remaining after the dominant set (layer 1) is removed, the third layer is the dominant sent of all routes remaining after layers 1 and 2 are removed, and so on.

BRIEF DESCRIPTION OF THE DRAWINGS

FIG. 5 is a schematic diagram illustrating data structures used by a routing method according to an embodiment of the present invention.

FIG. 6 is an outline of the steps of a method for packet routing according to one embodiment of the invention.

DETAILED DESCRIPTION

Figure 1:
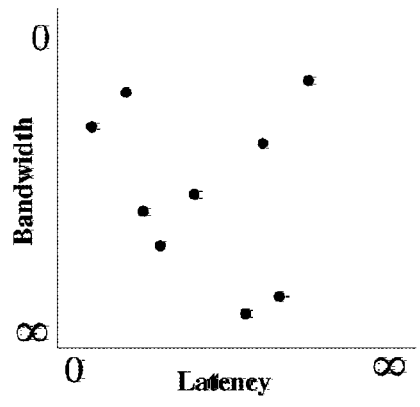
FIG. 1 is a graph of points in a multi-dimensional space whose dimensions correspond to the route metrics of latency and inverse bandwidth. Each point represents the multi-dimensional path weight corresponding to a route in the network between a given source and destination.

A key aspect of the present invention is the representation of multiple distinct route performance metrics as points in a multi-dimensional space, such that the routes can be organized using a partial ordering of the points. The term "partial order" is defined herein in accordance with its standard mathematical definition, i.e., a partial order on a set R is a relation that is reflexive, anti-symmetric, and transitive. A partial order is distinguished from the familiar notion of a linear order (or total order). For example, the relation "≤" (less than or equal) defines a linear order on the set of real numbers. This linear order has the property that, given two numbers a and b, it is always the case that a≤b or b≤a. With a partial order, however, this property (called comparability) is not in general satisfied for any two elements. Moreover, whereas a finite set has just one unique linear order, it can have multiple distinct partial orderings. In the case of the present invention, routes in the network correspond to points in a multi-dimensional space, and a partial order is defined on this set of points.

Each dimension of the multi-dimensional space corresponds to a network performance metric. A number of metrics can be used to quantify the performance of a communications network. For example latency is a measure of the delay traffic experiences as it traverses a network, jitter is a measure of the variation in that delay, bandwidth is a measure of the rate at which data can pass through a point in a network, and so on. Such individual performance metrics are well known in the art, as are methods for determining them.

Many applications have special requirements of the network they run on. For example interactive audio (i.e., VoIP) requires low latency and jitter of its communication channel to support natural, conversational interaction; however, it has relatively minimal bandwidth requirements. In contrast, video streaming requires high bandwidth and low jitter to provide a smooth viewing experience; however, it has relatively minimal latency requirements. In further contrast, interactive video (i.e., video conferencing) has the most demanding requirements in that it needs high bandwidth, low latency, and low jitter, combing the challenges of the previous two examples. The defining characteristic of these QoS requirements is they involve constraints on multiple performance metrics.

To satisfy constraints on multiple metrics requires, in general, the use of multiple paths between any two nodes in a network. For example, consider FIG. 9 which shows two paths through a network from source router 900 to destination router 902. The upper path through intermediate router 904 has large bandwidth and large latency, and the lower path through intermediate router 906 has low bandwidth and low latency. More specifically, the lower path has bandwidth of 0.1 Mbps, latency of 20 ms, and low jitter, and the upper path has bandwidth of 2 Mbps, latency of 200 ms, and low jitter. Path 1 would be preferred for an interactive audio application, while path 2 would be preferred for video streaming. With multiple metrics, the preferred path depends on the requirements of the application. In general, routing based on just one metric will not be suitable for all application types.

It is true, in the example described here, that a path that provides the QoS required by interactive video would satisfy all applications. However, the availability of such premium paths can not be depended on, and the use of such paths, when they exist, for less demanding applications is, in general, a waste of valuable communication resources.

Figure 9:
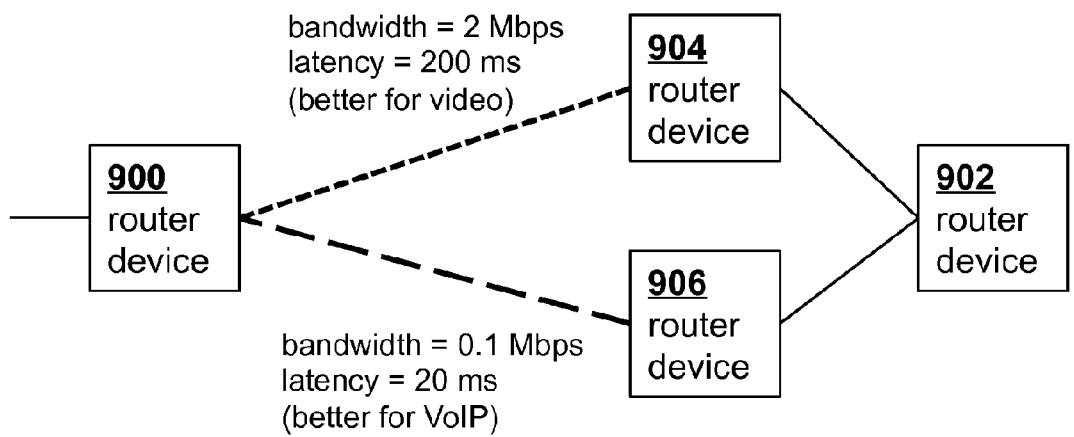
FIG. 9 shows two paths through a network, one with large bandwidth and large latency, and another with low bandwidth and low latency. Routing based on just one metric will not be suitable for all application types.

This correspondence between multiple metrics and multiple paths can be described formally by representing the set of metrics used to describe the performance of paths from a given source and destination pair as points in a multidimensional space. Such a set of multiple metrics will be referred to herein as a link or path weight. FIG. 1 plots the weights of nine paths between a specific source and destination in an example network where the metrics composing the weights are the inverse of bottleneck bandwidth and latency. "Better" values of these metrics tend to be located closer to the origin of the graph and "worse" values are farther away from the origin (i.e., a perfect path would have infinite bandwidth and 0 latency). As illustrated in FIG. 9, however, a linear ordering of the routes based on the distance from the origin is too simplistic.

Figure 2:
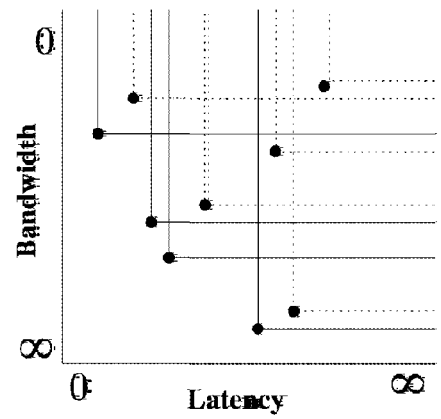
FIG. 2 is a graph of the points shown in FIG. 1 with rectangular quality-of-service regions of each route bounded by horizontal and vertical lines extending from each point away from the origin.

As shown in FIG. 2, each of the points in FIG. 1 defines a rectangular region of QoS values extending upwards and to the right from the point (or weight). The path represented by the weight is capable of satisfying any QoS requirement in its region of QoS values. Note that some regions are fully contained in the regions of other paths. In this case, the containing region is said to dominate the contained region. In the figure, the borders of these dominated regions are represented with dashed lines. The dominant regions are represented with solid lines, and their corresponding paths are called dominant paths.

Figure 3:
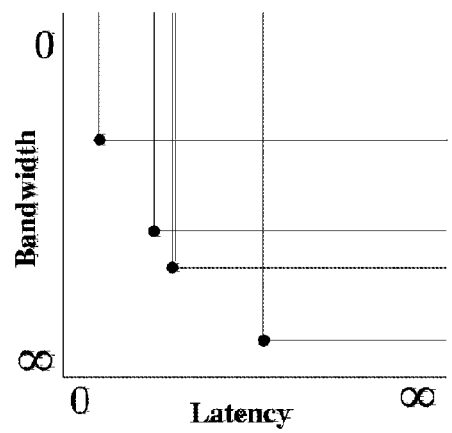
FIG. 3 is a graph of those points and quality-of-service regions of FIG. 2 that are maximal with respect to a partial order, defining quality-of-service classes for the routes in the network.

A "best" set of paths to the destination can be defined as the set of paths that are not dominated by another path. This set of paths is best in the sense that any QoS requirement that can be satisfied by an existing path between the given source and destination, can be satisfied by a path in this set. We call these regions the performance classes available from the network for the destination. FIG. 3 shows the performance classes for the example network.

The goal of the QoS routing method is to compute paths from a source to a destination in a network that satisfy the performance requirements, expressed in terms of constraints on multiple metrics, of applications communicating across the network. The formalism presented above shows that, by definition, QoS routing must support the use of multiple paths between a source and destination.

We have made the case that Intserv moves the Internet back to a less robust, efficient, and responsive virtual-circuit communication model, and is limited to the use of only one path to a given destination. Diffserve retains the best-effort, distributed, hop-by-hop datagram communication model; however, it is still restricted to the use of only one path to a given destination.

Furthermore, we have presented a definition of the best set of routes, based on the concept of a dominant set, that captures the full range of performance available in a network. In general, such a set contains multiple routes that satisfy the QoS requirements of a given flow. Based on these two properties the present invention provides a comprehensive multipath solution as one where packets in flows are forwarded over paths in the dominant set that both meet their QoS requirements and avoid creating congestion in the network, if such paths exist.

The method of the present invention provides the first routing solution that can make this commitment to avoid congestion and satisfy QoS requirements, if at all possible. A primary insight motivating this new routing architecture is viewing weights of the set of paths to a destination as a partially ordered set, and computing the dominant set of weights for this partial order as the foundation of a forwarding table. We call this model Dominant Set Multipath Routing (DSMR).

We now turn to the details of the DSMR algorithm, and analyze its runtime complexity. The results show that DSMR efficiently, in both computation time and memory space, computes the dominant set of paths from a given source to all destinations in a network. The remainder of the paper presents a forwarding architecture to support this routing model, and simulations that explore the efficacy of the DSMR architecture.

As described above, each path weight is composed of multiple component metrics that capture important performance measures of a link such as delay, delay variance ("jitter"), available bandwidth, reliability, etc. The best set of paths to a destination may be formally defined using an enhanced version of the path algebra defined by Sobrinho (Sobrinho. "Algebra and Algorithms for QoS Path Computation and Hop-by-Hop Routing in the Internet." *IEEE/ACM Transactions on Networking,* 10(4):541-550, August 2002).

Formally, the path algebra P=<W, $\oplus$, $\preccurlyeq$, $\sqsubseteq$, 0∞> is defined as a set of weights W equipped with a binary operator $\oplus$, and two order relations, $\preccurlyeq$ and $\sqsubseteq$, defined on W There are two distinguished weights in W, 0 and ∞, representing the least and absorptive elements of W, respectively. The binary operator $\oplus$ is the original path composition operator, and the order relation $\preccurlyeq$ is the original total ordering from Sobrinho, which is used to order the paths for traversal by the path selection algorithm. Binary operator $\oplus$ is used to compute path weights from link weights. The routing algorithm uses relation $\preccurlyeq$ to build the forwarding set, starting with the minimal element, and by the forwarding process to select the minimal element of the forwarding set whose parameters satisfy a given QoS request.

According to the present invention, a new relation on routes, $\sqsubseteq$, is added to the algebra and used to define classes of comparable routes and select maximal elements of these classes for inclusion in the set of forwarding entries for a given destination. Relation $\sqsubseteq$ is a partial ordering (reflexive, anti-symmetric, and transitive) with the following, additional property:

Property 1. $(\omega x \sqsubseteq \omega y) \Rightarrow (\omega x \succcurlyeq \omega y)$. In other words, if two weights satisfy the new partial ordering, then they also satisfy the original total ordering.

A route weight $r_m$ is defined to be a maximal element of a set R of route weights in a graph if $(r_m \sqsubseteq r) \Rightarrow r_m = r$ for all $r \in R$. In other words, no element $r \in R$ satisfies $r_m \sqsubseteq r$ except $r_m$ itself. A set $R_m$ of route weights is defined to be a maximal subset of R if for each $r_m \in R_m$, $(r_m \sqsubseteq r) \Rightarrow r_m = r$ for all $r \in R$. In other words, $R_m$ is a maximal subset if each element of $R_m$ is a maximal element in R. The maximum size of a maximal subset of route weights is the smallest range of the components of the weights (for the two component weights considered here). An example path algebra based on weights composed of delay and bottleneck bandwidth is shown in Table 1.

TABLE 1

Figure 4:
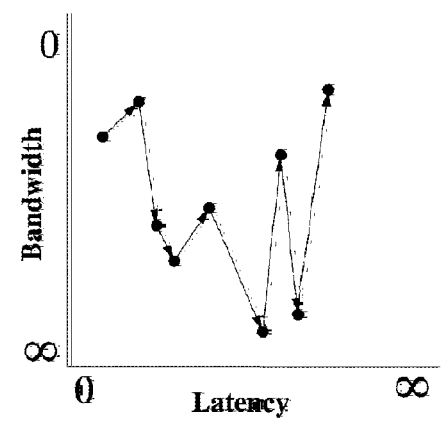
FIG. 4 is a graph of the points of FIGS. 1 and 2 showing a total ordering of the points, as contrasted with the partial ordering of FIG. 3.

Example path algebra $\omega_i \equiv (d_i, b_i)$
$0 \equiv (0, \infty)$
$\infty \equiv (\infty, 0)$
$\omega_i \oplus \omega_j \equiv (d_i + d_j, \text{Min}(b_i, b_j))$
$\omega_i \preccurlyeq \omega_j \equiv (d_i < d_j) \lor ((d_i = d_j) \land (b_i \geq b_j))$
$\omega_i \sqsubseteq \omega_j \equiv (d_i \leq d_j) \land (b_j \geq b_i)$ FIG. 4 is a graph showing the relation $\preccurlyeq$ on the set of weights used as an example in FIGS. 1-3, where $x \preccurlyeq y$ is depicted in the figure as x→y. The $\sqsubseteq$ relation, illustrated by FIG. 2, formalizes the notion of "dominates" as discussed above. And, lastly, $R_m$ formalizes the notions of performance classes in a graph, and is the "best" set of routes in the sense discussed above. The dominant (i.e., maximal) set of weights $R_m$ is illustrated in FIG. 3.

FIG. 6 is an outline of the steps of a method for packet routing according to one embodiment of the invention. In step 600 the network equipment computes, for each source node in the data network and each destination node in the data network, a set of multiple routes providing a full range of performance from the source node to the destination node. The details of this step will be described in more detail below. In step 602, the network equipment selects, for a packet (or flow) originating from a source node and addressed to a destination node, a route selected from the set of multiple routes computed in step 600. The path selection may be implemented, for example, using an oracle that always assigns flows to paths that both satisfy the flow's QoS requirements and have adequate available bandwidth for the new flow. In step 604, the network equipment forwards the packet in accordance with the route selected in step 602.

Figure 10:
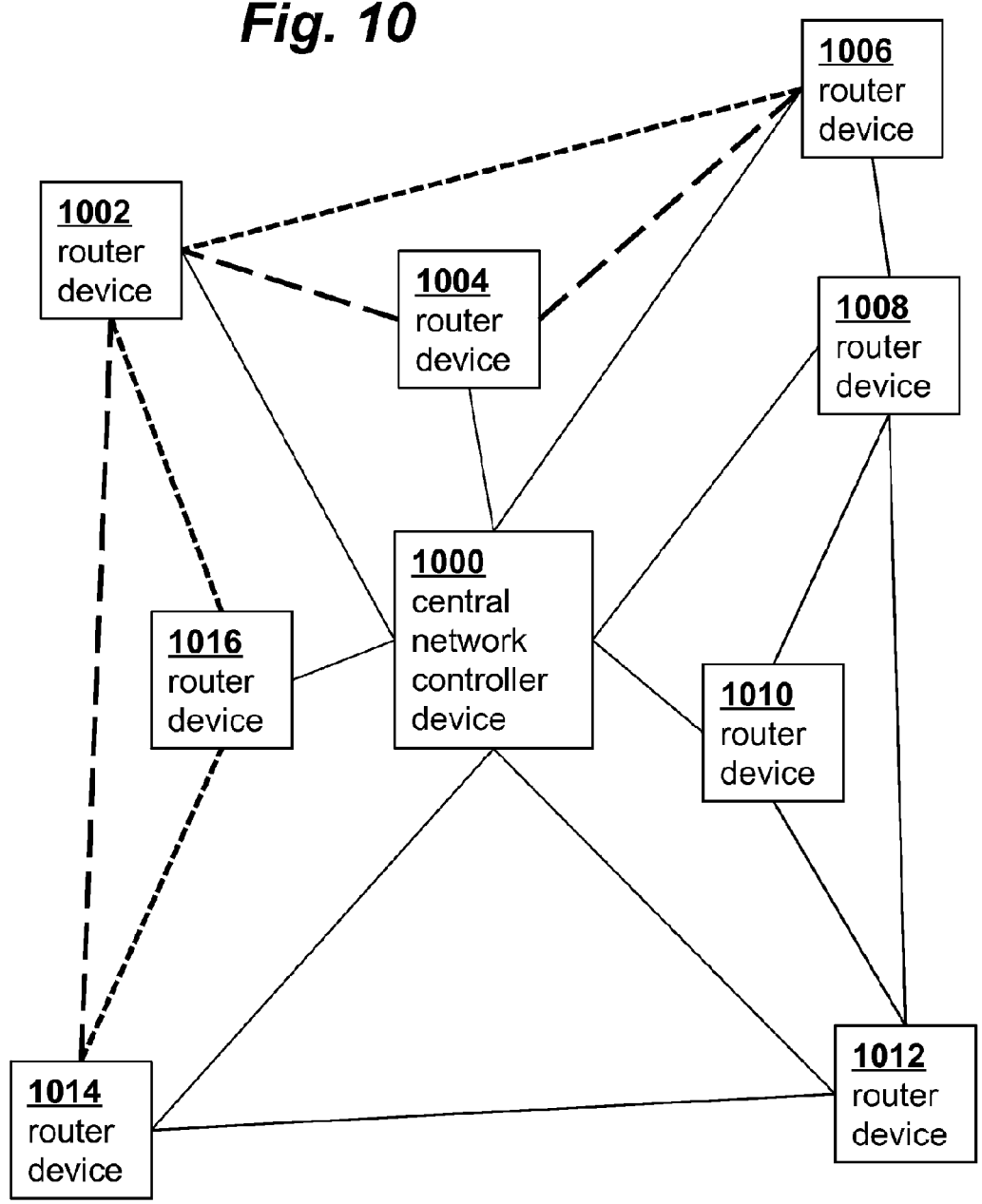
FIG. 10 is a schematic diagram illustrating a portion of a network including multiple router devices and a central network controller device, according to one embodiment of the invention.

FIG. 10 is a schematic diagram illustrating a portion of a network including multiple router devices 1002-1016 and a central network controller device 1000, according to one embodiment of the invention. The dashed lines indicate two alternate routes between device 1006 and device 1014. One route, indicated by a short dashed line, passes through intermediate devices 1002 and 1016. Another route, indicated by a long dashed line, passes through intermediate devices 1004 and 1002. These two routes might, for example, represent the multiple routes providing a full range of performance from source node 1006 to destination node 1014.

The router devices 1002-1016 may be conventional routers with standard forwarding technologies integrated into these routers and their software, modified to implement the techniques of the present invention. In some embodiments, the computing of the multiple paths, the selecting of a route, and the forwarding steps are all performed by each of the router devices 1002-1016. In these embodiments, the central controller 1000 is not necessary and may be eliminated. In other embodiments, compatible with "Open Flow" approaches to routing, the central controller 1000 computes the multiple routes. This precomputed routing information is then transmitted to each router device. For example, controller 1000 may compute the multiple routes from router 1006 to router 1014, then remotely updates the forwarding states of routers as appropriate. Each router with a packet to forward then independently selects a route from the multiple routes and forwards the packet over the selected route. This embodiment might be particularly useful in the case of a small or medium internet service provider (ISP), or organizations such as universities or larger corporations. In yet another embodiment, the central controller node 1000 not only computes the multiple routes, but also selects routes. For example, a router 1006 may query the central controller 1000 as needed to determine a route to forward a packet over. The central controller 1000 selects a route from the multiple routes and informs the router of the selection as a response to the query. In this embodiment, it is not necessary for central network controller to transmit computed multiple route forwarding information to the router devices. Allowing the central controller to select routes allows more intelligent congestion control in the network, but may increase latency.

We now discuss an algorithm, according to one embodiment of the invention, for computing a set of routes in a network that provide a full range of performance from a source node to a destination node. This algorithm is preferably precomputed, i.e., in advance of any particular packet or flow being transmitted onto the network rather than computed on-demand with each new packet or flow.

TABLE 2

Notation.

P ≡ Queue of permanent routes to all nodes.
$P_n$ ≡ Queue of permanent routes to node n.
T ≡ Heap of temporary routes.
$T_n$ ≡ Entry in T for node n.
$B_n$ ≡ Balanced tree of routes for node n.
$E_n$ ≡ Summary of traffic expression for all routes in $P_n$.

The notation used in the algorithm presented below is summarized in Table 2. In addition, the maximum number of distinct performance classes is denoted by $W_{max}$, and the maximum number of adjacent neighbors by $a_{max} = \max\{|A(i)| | i \in N\}$. Table 3 defines the primitive operations for queues, heaps, and balanced trees used in the algorithm, and gives their time complexity used in the complexity analysis.

TABLE 3

Operations on Data Structures

| Notation | Description |
| --- | --- |
| | Queue |
| Push(r, Q) | Insert record r at tail of queue Q (O(1)) |
| Tail(Q) | Return record at tail of queue Q (O(1)) |
| | d-Heap |
| Insert(r,H) | Insert record r in heap H ($O(\log_d(n))$) |
| IncreaseKey(r,$r_h$) | Replace record $r_h$ in heap with record r having greater key value ($O(d \log_d(n))$) |
| DecreaseKey(r,$r_h$) | Replace record $r_h$ in heap with record r having lesser key value ($O(\log_d(n))$) |
| Min(H) | Return record in heap H with smallest key value (O(1)) |
| DeleteMin(H) | Delete record in heap H with smallest key value ($O(d \log_d(n))$) |
| Delete($r_h$) | Delete record $r_h$ from heap ($O(d \log_d(n))$) |
| | Balanced Tree |
| Insert(r,B) | Insert record r in tree B (O(log(n))) |
| Min(B) | Return record in tree B with smallest key value (O(log(n))) |
| DeleteMin(B) | Delete record in tree B with smallest key value (O(log(n))) |

The algorithm presented in this section is based on the data structure model shown in FIG. 5. In this structure, a balanced tree 500 ($B_i$) is maintained for each node in the graph to hold newly discovered, temporary labeled routes for that node. The heap 502 T contains the lightest weight entry from each non-empty $B_i$ (for a maximum of n entries). A queue 504 $P_i$ is maintained for each node which contains the set of permanently labeled routes dis-covered by the algorithm, in the order in which they are discovered (which will be in increasing weight).

The general flow of the algorithm is to take the minimum entry from the heap T, compare it with existing routes in the appropriate $P_i$, if it is incomparable with existing routes in $P_i$ it is pushed onto $P_i$, and "relaxed" routes for its neighbors are added to the appropriate $B_x$'s.

Below is a listing of a modified Dijkstra SPF algorithm that computes the maximal set of routes to each destination subject to multiple metrics. The correctness of this algorithm is based on the maintenance of the following three invariants: for all routes $I \in P_*$ and $J \in B_*$, $I \preceq J$, all routes in a given $P_i$ are incomparable, and the maximal subset of routes to a given destination i in $P_i \cup B_i$ represents the maximal subset of all paths to i using nodes with routes in P. Furthermore, these invariants are maintained by the following two constraints on actions performed in each iteration of these algorithms: (1) only known-non-maximal routes are deleted or discarded, and (2) only the smallest known-maximal route is moved to P.

The time complexity of the DSMR algorithm is dominated by the loops at lines 4 and 12. The loop at line 4 is executed at most once for each incomparable path (in terms of path weights) to each node in the graph for a total of $nW_{max}$ times. The loop at line 12 is executed at most once for each distinct instance of an edge in the graph, for a total of $mW_{max}$ times. The most time consuming operation performed as part of the loop at line 4 is the deletion from the balanced tree $B_i$ at line 6 of the best temporarily labeled route with per-operation cost of $\log a_{max}W_{max}$, and an aggregate cost of $nW_{max} \log a_{max} W_{max}$. The accesses in lines 7-9 to the best route in heap T have a per-operation cost $\log_d n$, for an aggregate cost of $mW_{max} \log n$. For the loop at line 12, the most time consuming operation is the addition to the balanced tree $B_i$ at line 18 with a per-operation cost of $\log a_{max}W_{max}$, and an aggregate cost of $mW_{max} \log a_{max}W_{max}$. Therefore, the worst case time complexity of DSMR, dominated by the operation at line 18, is $O(mW_{max} \log W_{max})$. Algorithms using enhanced data structures achieve time complexity of $O(mW_{max} \log(n))$.

Modified Dijkstra SPF Algorithm for DSMR.

| algorithm DSMR |
| --- |
| begin |
| 1   Push(<s,s,0>, Ps); |
| 2   for each {(s, j) ∈ A(s)} |
| 3     Insert(<j,s,$\omega_{sj}$>, T); |
| 4   while(|T|>0) |
|     begin |
| 5     <i, $p_i,\omega_i$> ← Min(T); DeleteMin($B_i$); |
| 6     if(|$B_i$|=0) |
| 7       then DeleteMin(T) |
| 8       else IncreaseKey(Min($B_i$), $T_i$); |
| 9     if($\omega_i \not\subseteq$ Tail($P_i$).ω) |
|       then begin |
| 11      Push(<i,$p_i,\omega_i$>, $P_i$); |
| 12      for each {(i, j) ∈ A(i) | $\omega_i \oplus \omega_{ij} \not\subseteq$ Tail($P_j$).ω} |
|         begin |
| 13        $\omega_j \leftarrow \omega_i \oplus \omega_{ij}$; |
| 14        if($T_j = \emptyset$) |
| 15          then Insert(<j,i,$\omega_j$>, T) |
| 16          else if ($\omega_j \prec T_j.\omega$) |
| 17            then DecreaseKey(<j, i, $\omega_j$>, T ); |
| 18      Insert(<j,i,$\omega_j$>, $B_j$); |
|         end |
|       end |
|     end |
| end |

DSMR has a number of features that make it particularly well suited to the dual challenges of QoS routing and minimizing congestion. The set of routes computed by DSMR provides the full range of performance available from a network. This provides the assurance, lacking in other proposals, that if paths exist in a network that satisfy a given flow's QoS requirements, one of them is in the set computed by DSMR.

In general, multiple routes may satisfy the QoS requirements for any given flow. This can be seen from FIG. 3 in that the four paths computed by DSMR all overlap. This overlap presents the opportunity to further distribute traffic over multiple paths, e.g., in order to reduce congestion.

Lastly, it should be emphasized that DSMR computes routes that support hop-by-hop forwarding.

Figure 7:
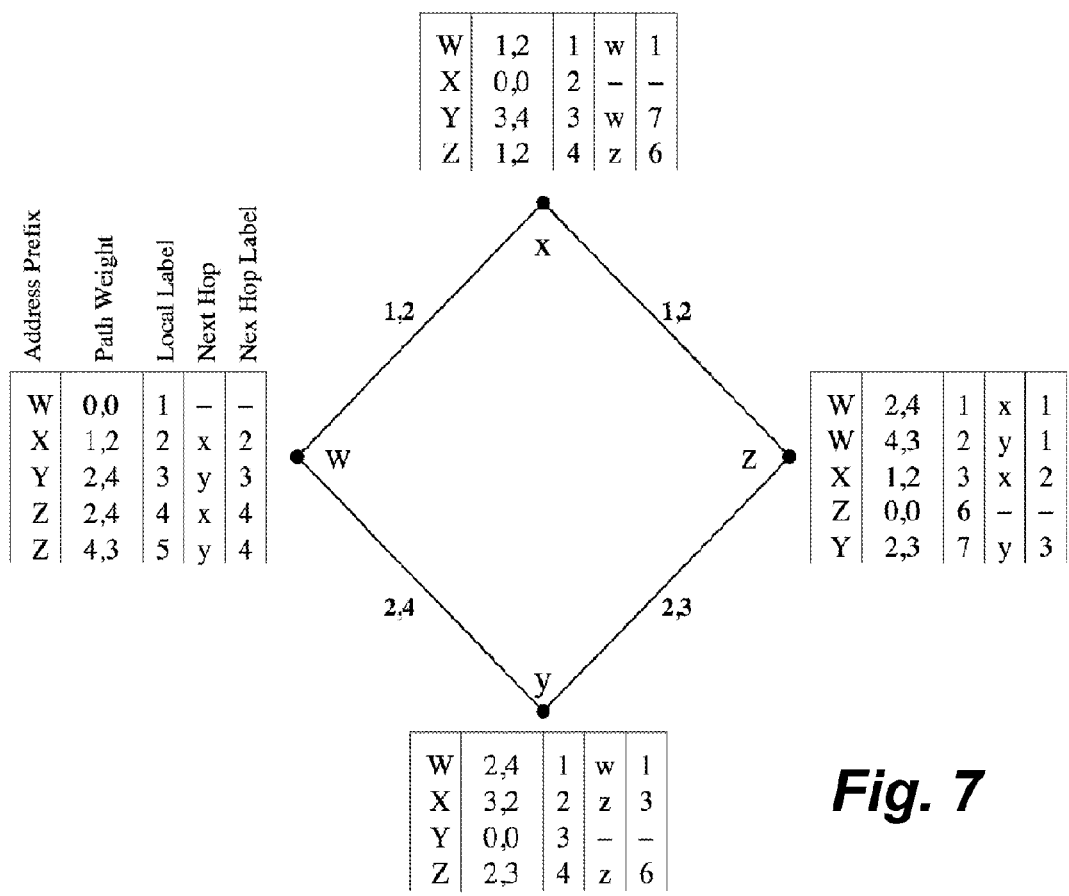
FIG. 7 is a schematic diagram illustrating forwarding tables including forwarding labels and an entry for each performance class according to one embodiment of the invention.

FIG. 7 is a schematic diagram illustrating four forwarding tables associated with four nodes of a network, indicated with labels W, X, Y, Z. Also shown are four links joining the nodes. These links are represented by lines between the nodes, each labeled with the two-dimensional weight of the link. The table for each node includes an entry (row) for each performance class. A performance class is defined by the weight of the path providing that performance class. Conceptually, forwarding involves determining the performance requirements for a packet based on traffic classification rules specified in terms of the contents of the packet, and selecting the path appropriate to these requirements.

Figure 8:
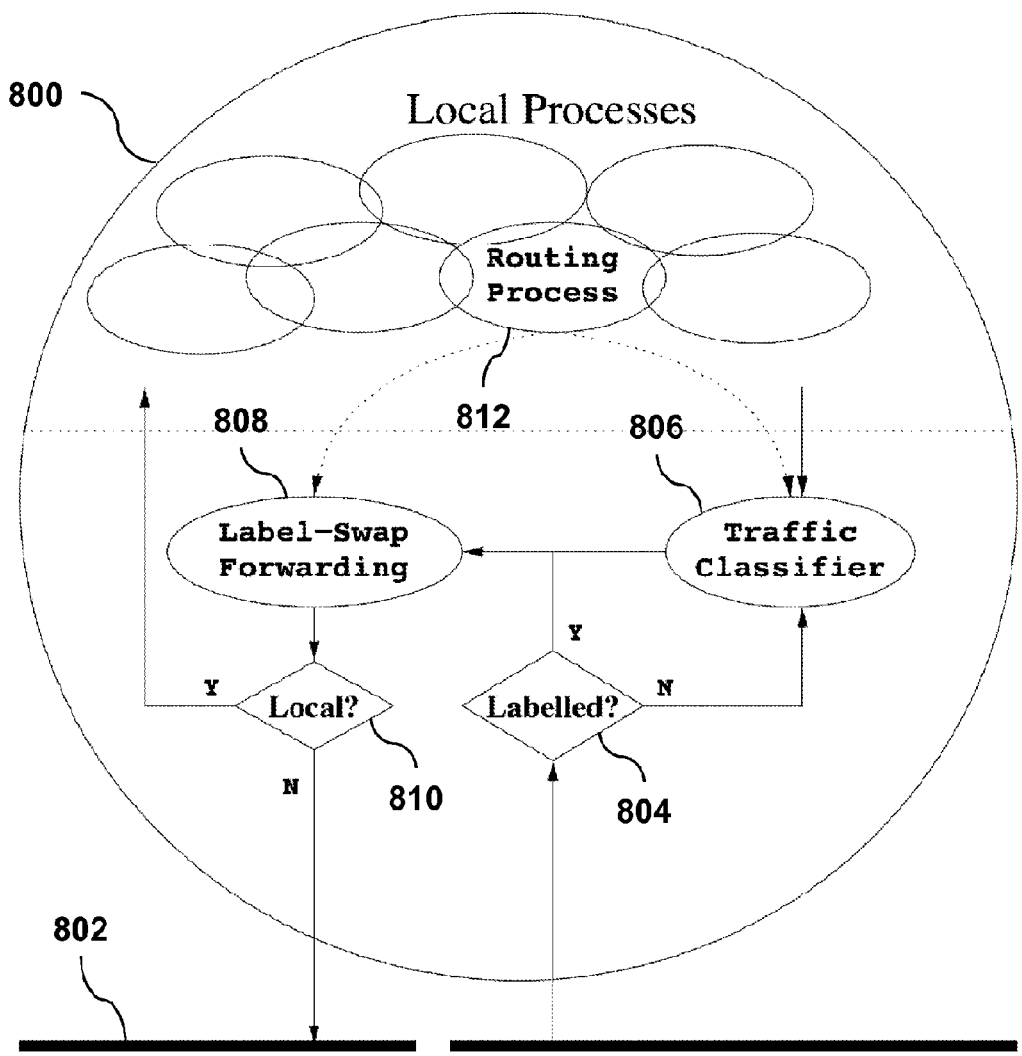
FIG. 8 is a schematic diagram illustrating classification of traffic flows in a network router device according to an embodiment of the present invention.

Performing this traffic classification step at each hop in the network would be prohibitively expensive. To avoid this, preferred embodiments use label-swap forwarding so that only the first router that handles a packet needs to perform a traffic classification before forwarding it. Accordingly, the forwarding state of a router is enhanced to include local and next hop forwarding label information, in addition to the destination and next hop information existing in traditional forwarding tables, as shown in the table for node W. Traffic classifiers are placed at the edge of an internet, where "edge" is defined to be any point from which traffic can be injected into the internet. FIG. 8 illustrates schematically aspects of packet processing by a router device 800 connected to an internet subnet 802 according to one embodiment of the invention.

To date, label-swapping has been used in the context of connection-oriented (virtual circuit) packet forwarding architectures. In these applications, a connection setup phase establishes the labels that routers should use to forward packets carrying such labels, and a label refers to an active source-destination connection. Also known is the technique of threaded indices, in which neighboring routers share labels corresponding to indexes into their routing tables for routing-table entries for destinations, and such labels are included in packet headers to allow rapid forwarding-table lookups. The forwarding labels in a best-effort QoS environment according to embodiments of the present invention are similar in some aspects to threaded indices. A label is assigned to each routing-table entry, and each routing-table entry corresponds to a policy-based route maintained for a given destination. Consequently, for each destination, a router exchanges one or multiple labels with its neighbors. Each label assigned to a destination corresponds to the set of service classes satisfied by the route identified by the label.

The forwarding architecture according to embodiments of the present invention may be implemented, for example, using the downstream tag allocation method described in Cisco's Tag Switching Architecture. In downstream tag allocation, routers allocate tags as a part of the routing computation, assigning a tag to each forwarding table entry. The binding of these tags with routes is then advertised to adjacent routers that support tag switching. Routers can use the tag information to construct their own Tag Information Base, which is used for label-swap forwarding.

Simulations of the dominant set multipath routing solution for network congestion and QoS routing have verified that the capacity of a network improves when moving from single-path to DSMR routing, ranging from greater than a 300% improvement at the low end to greater than 1100% at the high end, with typical improvement in the range of 500% to 800%.

The invention claimed is:

1. A packet routing method implemented in a data network by network routing equipment, the method comprising:
    computing, for each source node in the data network and each destination node in the data network, a set of multiple routes providing a full range of performance from the source node to the destination node, where the full range of performance is defined by a set of dominant routes, where each route from the source node to the destination node in the data network has multiple distinct performance metrics defining coordinates of a corresponding point in a multi-dimensional space, where each of the dominant routes has a corresponding point in the multi-dimensional space that is maximal with respect to a partial order defined on points in the multi-dimensional space corresponding to routes from the source node to the destination node;
    selecting, for a packet originating from a source node and addressed to a destination node, a route selected from the computed set of multiple routes, where the selecting comprises determining quality of service performance requirements for the packet based on traffic classification rules, and selecting the route that both satisfies the quality of service performance requirements for the packet and has adequate available bandwidth for the packet, thereby reducing network congestion; and
    forwarding the packet in accordance with the selected route.

2. The method of claim 1 wherein the computing, selecting, and forwarding steps are all performed by a network router device.

3. The method of claim 1 wherein the computing and the selecting steps are performed by a central network controller device, and the forwarding step is performed by a network router device.

4. The method of claim 1 wherein the computing is performed by a central network controller device, and the selecting and forwarding steps are performed by a network router device.

5. The method of claim 1 wherein selecting the route comprises determining, if a label-swap tag is not present in the packet, computing the label-swap tag from traffic classification rules.

6. The method of claim 1 wherein the forwarding comprises forwarding the packet based on a label-swap tag in the packet.

7. The method of claim 1 wherein selecting the route comprises network load balancing among the computed set of multiple routes.

8. The method of claim 1 wherein the multiple distinct performance metrics defining coordinates of the multi-dimensional space comprise a bandwidth metric, a latency metric, and a jitter metric.

9. The method of claim 1 wherein the selecting comprises determining quality of service performance requirements for the packet based on traffic classification rules specified in terms of contents of the packet.

10. The method of claim 1 wherein the selecting comprises determining quality of service performance requirements for the packet based on traffic classification rules specified in terms of a user associated with the packet.

11. The method of claim 1 wherein the selecting comprises determining quality of service performance requirements for the packet based on traffic classification rules specified in terms of a port the packet arrives on.

12. The method of claim 1 wherein the selecting comprises determining quality of service performance requirements for the packet based on traffic classification rules specified in terms of environmental factors.

\* \* \* \* \*